(12) United States Patent
Armstrong et al.

(10) Patent No.: US 10,044,706 B2
(45) Date of Patent: *Aug. 7, 2018

(54) ENCRYPTION METHODS AND APPARATUS

(71) Applicant: Apple Inc., Cupertino, CA (US)

(72) Inventors: Kevin N. Armstrong, San Jose, CA (US); Per Love Hornquist Astrand, Emerald Hills, CA (US); Steven M. Williamson, Oakdale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/499,823

(22) Filed: Apr. 27, 2017

(65) Prior Publication Data

US 2017/0318006 A1 Nov. 2, 2017

Related U.S. Application Data

(63) Continuation of application No. 14/291,887, filed on May 30, 2014, now Pat. No. 9,667,620.

(51) Int. Cl.
*H04L 9/32* (2006.01)
*H04L 29/06* (2006.01)
*H04L 9/08* (2006.01)
*G06F 21/45* (2013.01)

(52) U.S. Cl.
CPC .......... *H04L 63/083* (2013.01); *G06F 21/45* (2013.01); *H04L 9/0863* (2013.01); *H04L 9/0891* (2013.01); *H04L 9/3228* (2013.01); *G06F 2221/2107* (2013.01); *G06F 2221/2117* (2013.01); *H04L 2463/061* (2013.01); *H04L 2463/062* (2013.01)

(58) Field of Classification Search
CPC . H04L 63/083; H04L 63/061; H04L 63/0853; H04L 2463/061; H04L 2463/062; H04L 9/0863; H04L 9/0891; H04L 9/3228; G06F 21/45; G06F 2221/2107; G06F 2221/2117
USPC ......................................... 713/171, 182, 184
See application file for complete search history.

(56) References Cited

U.S. PATENT DOCUMENTS 5,719,941 A * 2/1998 Swift ....................... G06F 21/31
340/5.54
6,240,184 B1 * 5/2001 Huynh ..................... G06F 21/31
380/206
6,539,479 B1 * 3/2003 Wu ........................ H04L 9/0844
380/227

(Continued)

*Primary Examiner* — Samson Lemma
(74) *Attorney, Agent, or Firm* — Dickinson Wright RLLP

(57) ABSTRACT

The embodiments discussed herein relate to updating and encrypting passwords for one or more computing devices. The computing devices can be associated with a common user account. According to the embodiments discussed herein, the user the can update a password of the user account at one computing device, and log into another computing device using the updated password without having to provide the current password for the other computing device. The embodiments incorporate a variety of encryption and key generation methods in order to safely transmit password updates between local computing devices. Specifically, the embodiments set forth methods and apparatus for generating and storing breadcrumbs that allow for decrypting a current password of a computing device using a new password.

20 Claims, 13 Drawing Sheets

(56) References Cited

U.S. PATENT DOCUMENTS

| | | | | |
|---|---|---|---|---|
| 6,996,718 | B1* | 2/2006 | Henry | G06F 21/41 |
| | | | | 713/182 |
| 8,369,525 | B2* | 2/2013 | Jordan | H04L 63/068 |
| | | | | 380/273 |
| 8,571,221 | B2* | 10/2013 | Little | G06F 21/72 |
| | | | | 380/255 |
| 2004/0081320 | A1* | 4/2004 | Jordan | G06F 21/606 |
| | | | | 380/247 |
| 2005/0232415 | A1* | 10/2005 | Little | G06F 21/72 |
| | | | | 380/28 |
| 2007/0174901 | A1* | 7/2007 | Chang | H04L 63/0846 |
| | | | | 726/5 |
| 2008/0151110 | A1* | 6/2008 | Hasegawa | H04H 20/08 |
| | | | | 348/466 |
| 2010/0306538 | A1* | 12/2010 | Thomas | H04L 9/0844 |
| | | | | 713/168 |
| 2013/0080765 | A1* | 3/2013 | Mohanty | H04L 63/0428 |
| | | | | 713/150 |
| 2016/0119312 | A1 | 4/2016 | Armstrong et al. | |

* cited by examiner

ENCRYPTION METHODS AND APPARATUS

CROSS-REFERENCE TO RELATED APPLICATIONS

The present application is a continuation of U.S. application Ser. No. 14/291,887, filed May 30, 2014, entitled "ENCRYPTION METHODS AND APPARATUS," the contents of which are incorporated herein by reference in their entirety for all purposes.

FIELD

The described embodiments relate generally to encrypting passwords for a computing device. More particularly, the present embodiments relate to automatically updating a password for one or more computing devices based on a previous password update.

BACKGROUND

Cyber security has become an increasing concern among device manufacturers as consumers have become accustomed to using various computing devices in almost every facet of their lives. Consumers regularly entrust their valuable personal information to a variety of devices and networks under the presumption that the device manufacturers and network hosts share the interests of the consumers. This presumption is often based on the security measures provided to consumers while performing functions on the device or participating in network activities. Such functions and activities can include registering for various accounts, saving personal information, logging into websites, making payments over the internet, and other network-based exchanges. Often times, a user can be required to provide a username and password before using a particular device or web-service. Over time, a password may expire because of a protocol put in a place by a particular service provider, or a user may choose to change their passwords at a desired frequency. Although coming up with a new password can be a relatively simple task, updating passwords can become complicated when a user owns multiple devices and each device requires a password.

The trend toward consumers owning multiple computing devices has increased the amount of security risks a user may face, but has also provoked a variety of techniques for synchronizing information between devices for management of user data. However, such synchronization techniques can require user data to traverse wireless networks and servers thereby subjecting the user data to potential theft. If a server containing user data is undermined by an attacker and the user data is misappropriated, the attacker may be able to unlock multiple devices that a user owns if the user data contains passwords for those devices. This scenario can be difficult to avoid when the synchronization techniques are being performed by server hosts or by device manufacturers who are often given privileges to access passwords for devices. Additionally, the entity performing the synchronization may be torn between providing more security for user data and supplying an easier method for synchronizing passwords between devices. By limiting the availability of password synchronization between devices, a user may be frustrated by the tedious task of updating each device with a new password. Additionally, because each device may be associated with multiple accounts, it may be even more arduous for a user to resolve issues related to password synchronization between accounts if a network host or device manufacturer is not providing such services.

SUMMARY

This disclosure describes various embodiments that relate to encryption methods and apparatus for a computing device. In some embodiments, a method for updating a password is set forth. The method can include steps of, at a computing device, receiving a new password at the computing device. The new password can be different than a current password for a user account accessible at the computing device. The method can further include a step of decrypting, using the new password, an encrypted key and deriving the current password from the encrypted key.

In other embodiments, a machine-readable non-transitory storage medium is set forth. The machine-readable non-transitory storage medium can store instructions that, when executed by a processor included in a computing device, can cause the computing device to carry out steps that include generating a first key. The first key can be generated by encrypting a current password with a random key. The first key can be stored at the computing device. The instructions can further include a step of generating a second key by encrypting the random key with the current password and sending the second key to a remote device.

In additional embodiments, an apparatus is set forth. The apparatus can include a processor and a memory. The memory can store instructions that when executed by the processor cause the processor to carry out steps that include generating a first random key and a second random key. The steps can further include a step of creating a device key by encrypting a current password with a first random key. Additionally, the steps can include creating an encrypted first key by encrypting the first random key with the second random key. Moreover, the steps can include sending the encrypted first key to a server device and storing the device key and the second random key in the memory.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
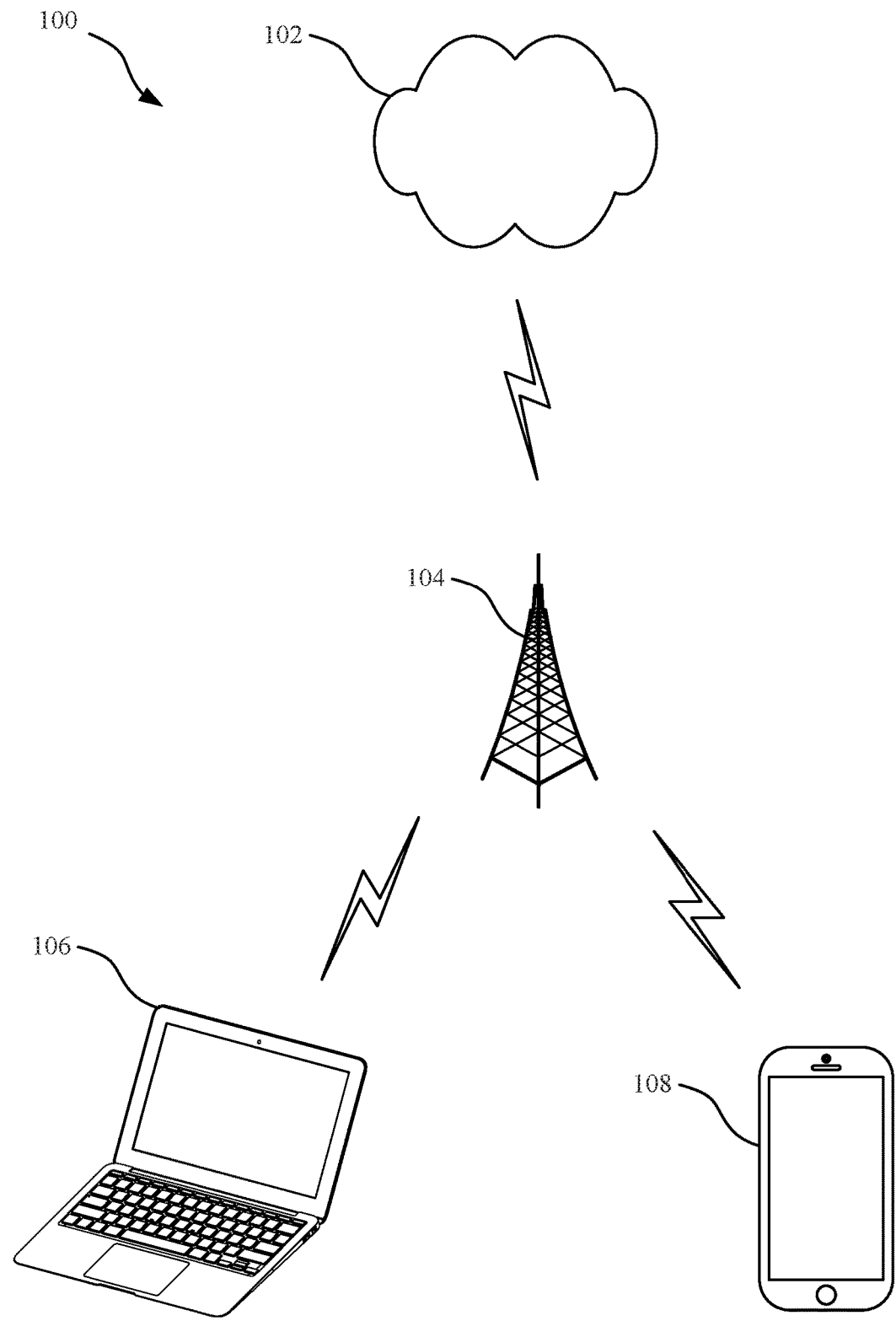
FIG. 1 illustrates a system diagram for a establishing a common user account among multiple devices.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to updating and encrypting passwords for one or more computing devices. The computing devices can be associated with a user account that requires a password in order to access the computing device, web services, or any other functions related to computing devices. The user account can be updated through a computing device owned by a user or through a web interface that provides access to the user account. A user may choose to update a password for the user account at any given time, or the user can be prompted to do so by a computing device. During an initial setup of a first computing device, an original password can be configured for the use by the first computing device in order to unlock or otherwise access a user account at the first computing device. The first computing device can then generate a key such as a random key or password-based key, and thereafter encrypt the original password with the key and encrypt the key with the original password. The key encrypted with the original password can be sent to a server associated with the user account for storage, as well as any other computing devices associated with the user account (e.g., a second computing device). The original password encrypted with the key can be stored locally at the first computing device. Next, to perform a password update, a user can update the original password with a new password by providing both the original password and new password into an interface of the first computing device. The key encrypted with the original password can be downloaded from the server and thereafter be decrypted using the original password that was entered, in order to derive the key. Thereafter, the key can be re-encrypted using the new password and sent to the server. By having the key encrypted with the new password at the server, password updates can be performed the other computing devices associated with the user account without having to enter the previous current password at the other devices.

Subsequent to the password update, a user can enter the new password at a second computing device that still uses the original password. However, the second computing device will not immediately recognize the new password because the second computing device requires the original password. In response to not recognizing the new password, the second computing device can download the key encrypted with the new password from the server. Using the new password entered at the second computing device, the key can be decrypted from the key encrypted with the new password. The second computing device can use the key to derive the original password from the original password encrypted with the key stored at the second computing device. Using the original password, the second computing device can be unlocked and updated to use the new password instead of the original password. In summary, the user has essentially updated the password at the second computing device by only entering the new password at the second computing device. In other embodiments, instead of sending the key encrypted with a password to the server, random data encrypted with the key can be sent to the server in order to prevent a user from having their password sent outside of a local device. Additionally, in some embodiments, the keys stored at the server can be device specific and individually updated during a password update procedure.

In yet other embodiments, a first computing device can execute a key derivation function (KDF) in order to derive a first key from a current password entered at the first computing device. A password based key derivation function (PBKDF) can be used to derive a second key from a new password entered at the first computing device. In some embodiments discussed herein, the first key and second key can be created by encrypting a combination of data that includes: a PBDKF or KDF using the current password and a random key, salt, an iteration count, and/or a network order, or any combination thereof. The iteration count can refer to the number of iterations that are performed to generate the first key, and a network order can refer to the hierarchy of the first key relative to any other keys being generated or other networks that may be sending or receiving the first key. A breadcrumb, or encrypted key, can be created by encrypting the first key with the second key. The breadcrumb can thereafter be sent to a server device for later use by a second computing device during a password update of the second computing device. For example, when the user enters the new password at the second computing device that has not yet received the new password, the second computing device can download the breadcrumb from the server device. The new password can be converted into the second key by the second computing device and thereafter used to derive the first key from the breadcrumb. The current password can be derived from the first key and used to unlock and/or update the password for the second computing device.

These and other embodiments are discussed below with reference to FIGS. 1-11. However, those skilled in the art will readily appreciate that the detailed description given herein with respect to these Figures is for explanatory purposes only and should not be construed as limiting.

FIG. 1 illustrates a system diagram 100 for establishing a common user account among multiple devices. The multiple devices can be include various computing devices not limited to cell phones, desktop computers, laptop computers, media players, and tablet computers. As shown in FIG. 1, a laptop computing device 106 and mobile device 108 can be configured to communicate over a wireless network 104. The wireless network 104 provides a medium for communication to access various servers and websites over the network device 102. A user of the mobile device 108 and laptop computing device 106 can own a user account that is accessible through the mobile device 108, laptop computing device 106, as well as over the network device 102. The user account can be associated with the manufacturer of the mobile device 108 and laptop computing device 106, or be related to another computer-related service. For example, the user account can be stored on the mobile device 108 and the laptop computing device 106 such that a user must supply a password for the user account in order to unlock and operate the mobile device 108 and laptop computing device 106. The same password and user account can be stored on a server that can be accessible over the internet through the mobile device 108 and laptop computing device 106, or through a computing device not owned by the user (e.g., a computer at a public terminal). The server can be used to provide various web services upon being supplied at least the password for the user account. In this way, a password can be shared among multiple devices and servers allowing the user to have one password among multiple devices and multiple web services. However, issues can arise when a user chooses to or is required to change a password for the user account.

Figure 2:
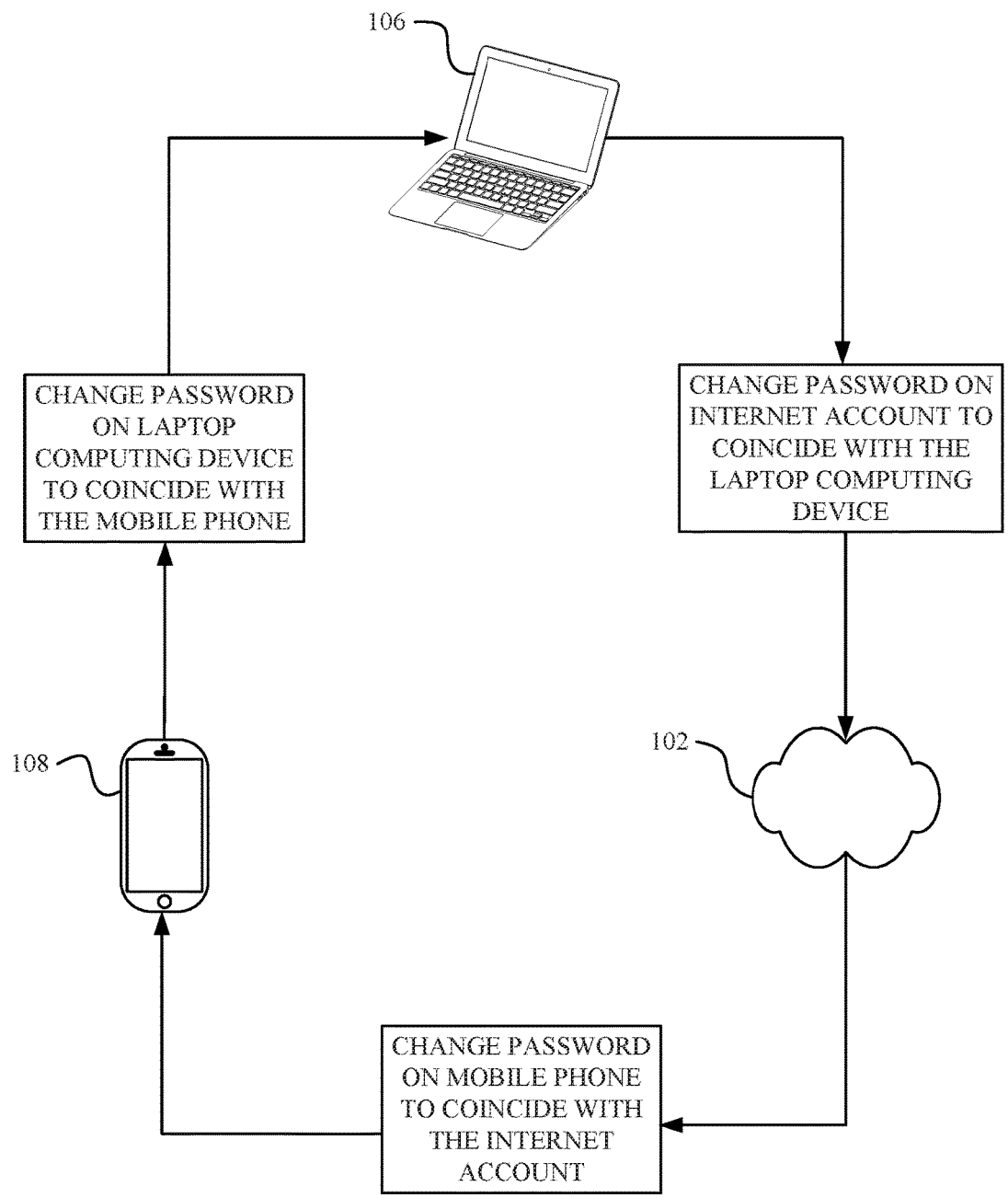
FIG. 2 illustrates an example of a flow diagram for changing passwords for a user account shared among multiple devices and an internet account.

FIG. 2 illustrates an example of a flow diagram for changing passwords for a user account shared among multiple devices and an internet account. Specifically, FIG. 2 illustrates how repetitious the task of updating passwords can be when the various devices (e.g., the mobile device 108 and laptop computing device 106) and web services (e.g., a user account on the network device 102) managed by a user do not share user account information such as passwords. Essentially, each time the user updates a password at a device or web service, the user must then update the password on all the other devices or web services. The reason for this lack of sharing of passwords and account information among devices and web services is often motivated by security reasons in order to limit opportunities for an attacker to intercept user account information. Although many security measures exist related to random key generation and cryptography, it is often the case that a password must still be disclosed to a non-user device or service for safe-keeping. Moreover, if a user that wanted to change a password quickly upon notice of an attacker, the user would not be able to do so in a timely manner on multiple devices because the user would be required to individually update passwords for each device. The embodiments discussed herein are set forth to resolve these aforementioned issues.

Figure 3A:
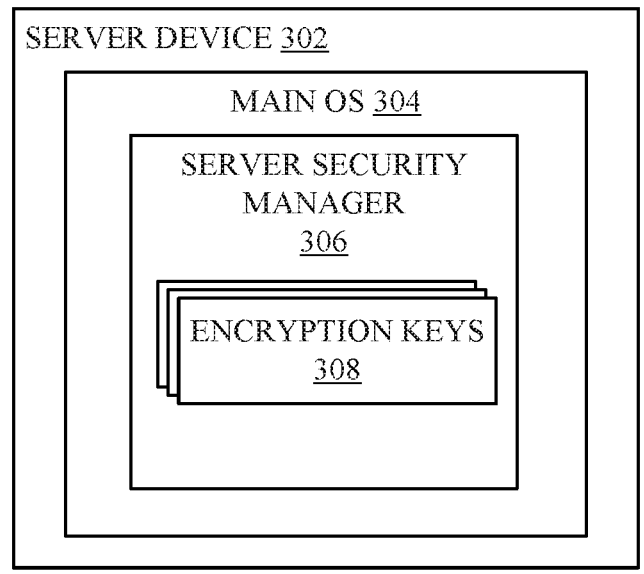
FIGS. 3A-3B illustrate system diagrams for a server device and client device, according to some embodiments discussed herein.
Figure 3B:
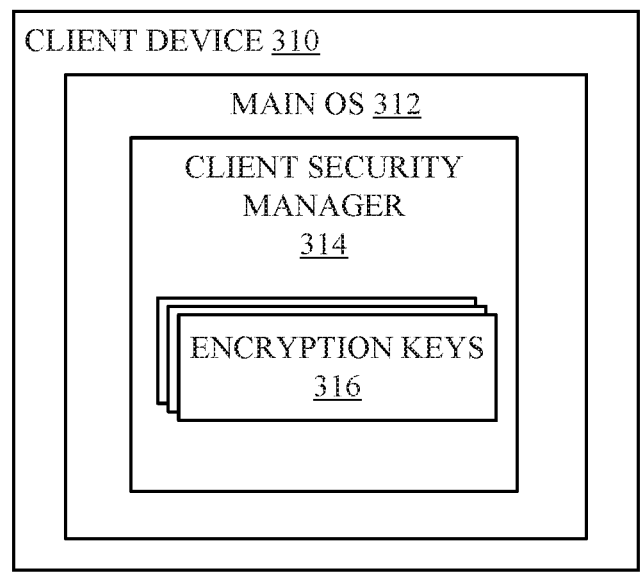

FIGS. 3A-3B illustrate system and flow diagrams for sending and receiving user account information between devices according to some embodiments discussed herein. Specifically, FIG. 3A illustrates a server device 302 representative of the network device 102. The server device 302 can include a main operating system (OS) 304 and a server security manager 306 operated by the main OS 304. The server security manager 306 can access and manage one or more encryption keys 308, which can include encrypted keys and passwords as further discussed herein. FIG. 3B illustrates a client device 310 representative of the laptop computing device 106, mobile device 108, or any other computing device discussed herein. The client device 310 can include a main operating system 312 and a client security manager 314 operated by the main OS 312. The client security manager 314 can access and manage one or more encryption keys 316, which can include encrypted keys and passwords as further discussed herein.

Figure 4:
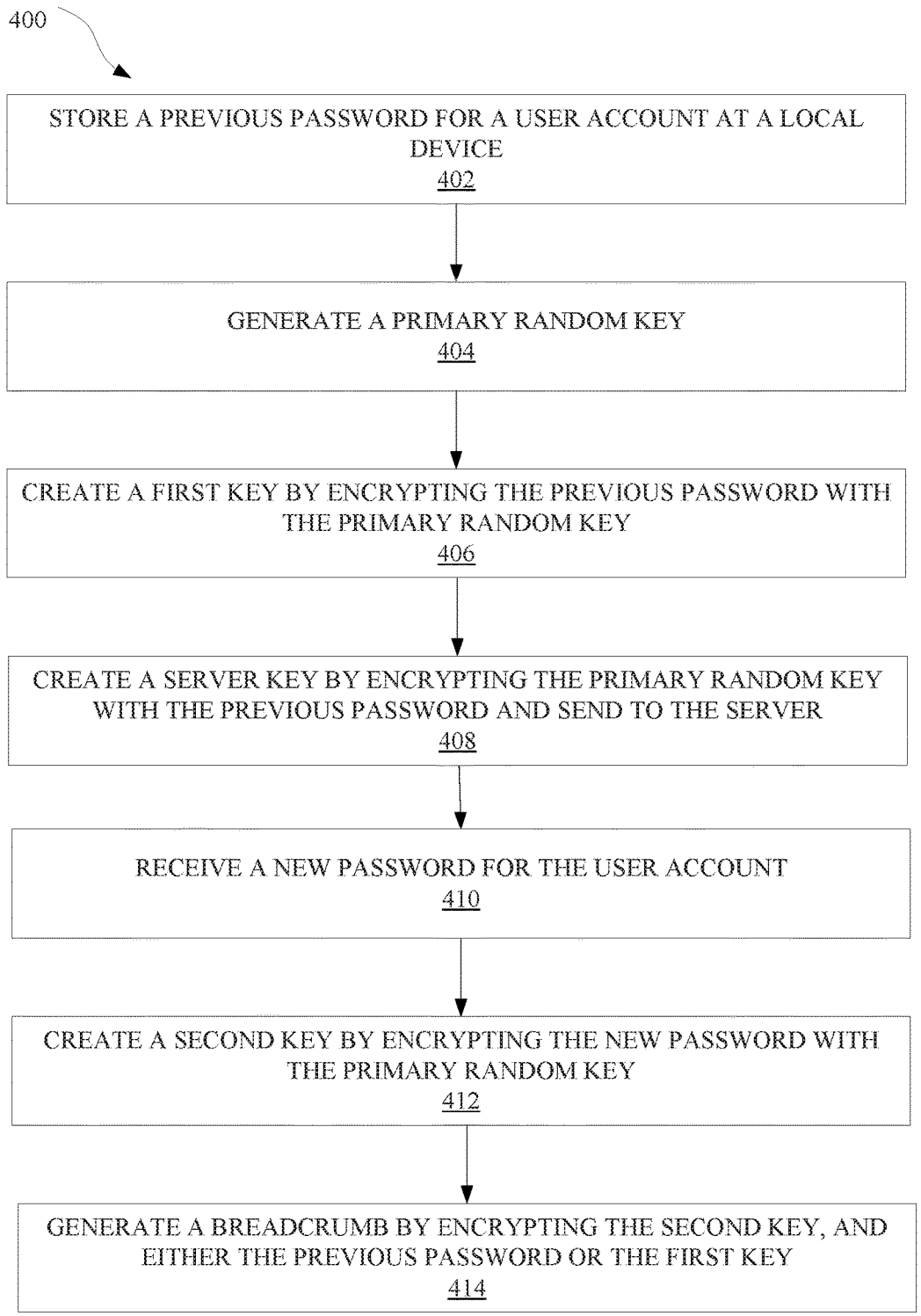
FIG. 4 illustrates a method for creating a breadcrumb, according to some embodiments discussed herein.

FIG. 4 illustrates a method 400 for creating a breadcrumb according to embodiments discussed herein. A breadcrumb is a quantity of data or information that includes at least a key and a password. The key can be a random key, a pseudo-random key, a password-based key generated from a key derivation function, or any other suitable key generated from an algorithm or cryptography method. The password can be a password for a computing device, web service, internet site, software application, or any other computer-related password. The password can be of any suitable length for a particular application, and the password can be padded to a fixed length in order to conceal the length of the password. For example, a password of 4 bytes can be padded to a length of 256 bytes in order to hide the true length of the password. In some embodiments, the breadcrumb can be salted, which refers to the addition of randomly generated data into the breadcrumb, key, and/or password in order to provide extra security when multiple breadcrumbs are stored on a particular device.

The breadcrumb can be generated according to the method 400 of FIG. 4. The method includes a step 402 wherein the client security manager 314 stores a previous password for a user account. The previous password can be an old password or current password for a device, account, web service, or any other password related to functions of the client security manager 314. Additionally, the password can include any suitable characters for creating a secure password and can be modified according to any of the embodiments discussed herein. At step 404, a primary random key is generated by the client security manager 314 for use in later steps for deriving additional keys based off of the primary random key. At step 406 of method 400, a first key is created by the client security manager 314 by encrypting the previous password with the primary random key, and thereafter storing the first key at the local device. The primary random key can include any randomly generated data of any suitable length (e.g., 16 bytes, 20 bytes, 256 bytes, etc.). At step 408, a server key is created by the client security manager 314 by encrypting the primary random key with the previous password and sending the server key to a server. The server key can thereafter be downloaded to one or more local devices when a new password is entered at the local device for the first time after a password update has been performed for the user account.

A new password for the user account is received by the client security manager 314 at step 410 of method 400. The new password can be a password automatically generated by the client security manager 314 or a password created by a user of the client security manager 314. For example, in some embodiments, a new password can be generated in response to a user forgetting their password for the user account and thereafter the user indicating to the client security manager 314 or web service that they do not remember their password. In response, the client security manager 314 or web service can create a new password automatically based on randomly generated data or credentials entered by a user through a previously established protocol. In other embodiments, the user can manually enter a new password at the client security manager 314 in order to update the password of the user account for one or more of their computing devices, user accounts, and/or web services. A second key is encrypted by the client security manager 314 at step 412 of the method 400 by using the new password and the primary random key. The second key can be derived in a same or similar manner as the first key or according to any embodiment discussed herein.

At step 414 of method 400, in order to create the breadcrumb, the second key can be encrypted by the client security manager 314 using the previous password or the first key. In some embodiments, the breadcrumb is generated by encrypting the second key with the previous password. In this way, a user can unwrap the second key using the new password, and thereafter derive the old password. In other embodiments, the breadcrumb is generated by encrypting the second key with the first key. In this way, a user can unwrap the second key using the new password, and thereafter derive the primary random key from the second key. The primary random key can thereafter be used to unwrap the first key to ultimately retrieve the old password from the first key. The breadcrumb can be stored on the client security manager 314 alone and be updated periodically according to the embodiments discussed herein, or the breadcrumb can be stored with other newer and/or older breadcrumbs as more password updates are performed. The breadcrumb can also be stored at the server security manager 306. The method 400 can be modified according to any of the embodiments discussed herein, or for any suitable application for breadcrumbs.

Figure 5:
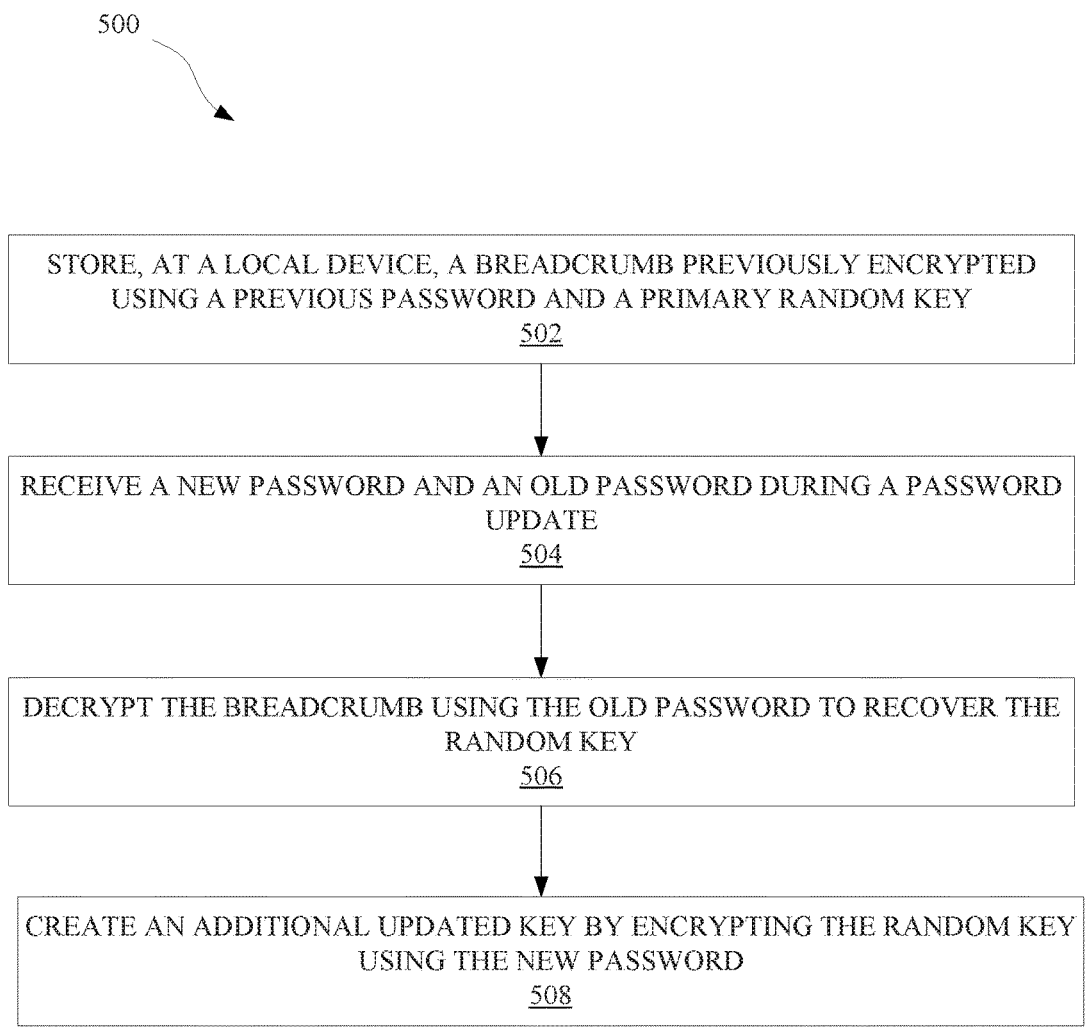
FIG. 5 illustrates a method for updating and storing multiple breadcrumbs at a client device, according to some embodiments discussed herein.

FIG. 5 illustrates a method for updating and storing multiple breadcrumbs by the client security manager 314 according to embodiments discussed herein. Specifically, FIG. 5 illustrates an embodiment of updating and storing multiple breadcrumbs using the processor and memory of the client device 310, which hosts the client security manager 314. The client device 310 can be a mobile device 108, laptop computing device 106, desktop computer, server, or any other suitable computing device using during a password updating process. The method 500 can be modified and arranged according to other embodiments discussed herein, and can incorporate other processes and definitions included herein. The method 500 can include a step 502 of storing, by the client security manager 314, a breadcrumb that was previously encrypted or otherwise created based on a previous password and a primary random key. During a password update, at step 504, the client security manager 314 can receive a new password and an old password. The password update can be initiated by an automatic process of the client security manager 314 or a network device, or by the user operating the client device 310. At step 506, the breadcrumb is decrypted or unwrapped, by the client security manager 314, using the old password. By decrypting the stored breadcrumb with the old password, the random key can be revealed and used in subsequent processes. At step 508, the method 500 includes creating, by the client security manager 314, an additional updated breadcrumb by encrypting the random key using the new password. In this way, the updated breadcrumb and the previously stored breadcrumb can be stored together on the client device 310 for future use. In some embodiments, the previously stored password can be based on a first key and a second key each derived from multiple different previous passwords for a user account as discussed herein. In other embodiments, the previously stored password can be updated automatically at a local device after a password has been updated at a different local device or through a web service.

Figure 6A:
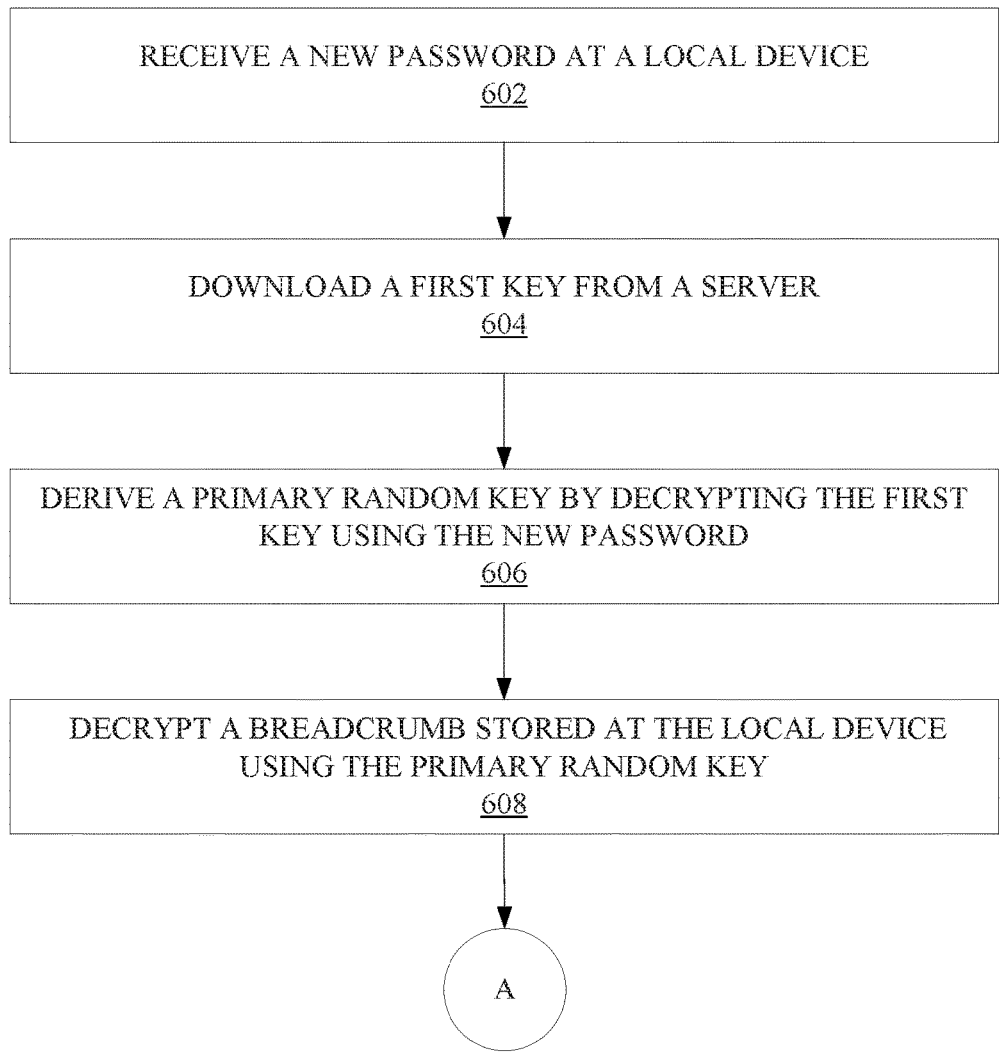
FIGS. 6A-6B illustrate a method for automatically updating a password at a local device using a breadcrumb and a key from a server, according to some embodiments discussed herein.
Figure 6B:
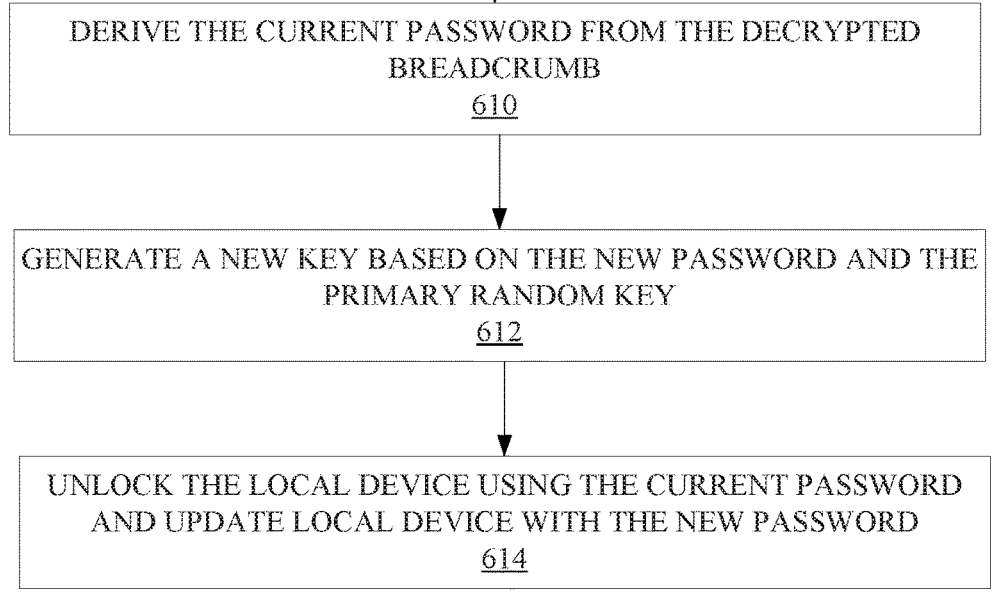

FIGS. 6A-6B illustrate a method 600 for automatically updating a password at a local device using a breadcrumb and a key from a server. Specifically, FIG. 6 illustrates an embodiment where a user is not required to update a password for a user account at the client device 310 if the password has already been updated at a different local device or a server device 302. In method 600, there is a presumption that the user has a breadcrumb stored in their client device 310, specifically at the client security manager 314. The breadcrumb can be created according to any of the embodiments discussed herein. The breadcrumb can therefore be encrypted based on a current password and a primary random key. The method 600 can include a step 602 wherein the client security manager 314 receives a new password. The password can be associated with the client security manager 314, a user account, or an external service that is accessed through the client device 310. Upon receiving the new password, the client security manager 314 will not recognize the new password because the client security manager 314 requires a current password in order to access the client security manager 314. In response, at step 604, the client security manager 314 will download a first key from a server device 302. The first key can be encrypted previously based on the new password and a primary random key during a previous password update. The method 600 further includes a step 606 of deriving, by the client security manager 314, the primary random key by decrypting the first key using the new password. The primary random key can be based on any suitable method for random or pseudorandom number generation. At step 608, the method 600 includes decrypting, by the client security manager 314, a breadcrumb stored at the client security manager 314 using the primary random key. The breadcrumb can be the current password encrypted using the primary random key. After the breadcrumb is decrypted, by the client security manager 314, the current password is derived from the decrypted breadcrumb at step 610. The method 600 can further include a step 612 of generating, by the client security manager 314, a new breadcrumb based on the new password and the primary random key. In this way, the multiple breadcrumbs can be stored at the client security manager 314. In some embodiments, the previous breadcrumb can be deleted and the new breadcrumb can remain. At step 614, the client security manager 314, is unlocked using the current password derived from the previous breadcrumb and the client security manager 314 is updated to only be accessed using the new password.

Figure 7:
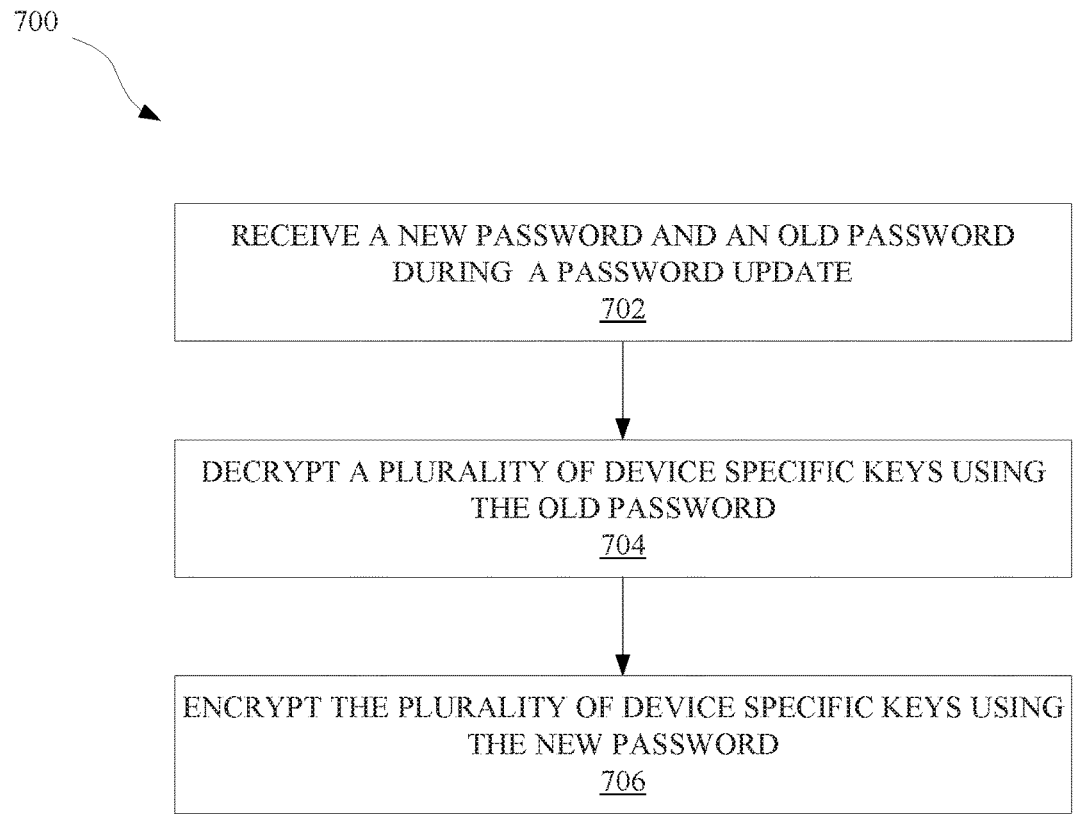
FIG. 7 illustrates a method for updating multiple device specific keys, according to some embodiments discussed herein.

FIG. 7 illustrates a method 700 for updating multiple device specific keys at a server security manager 306. Specifically, FIG. 7 illustrates a method 700 for updating a plurality of device specific keys during a password update of a user account or computing device associated with a user account. The method 700 can include a step 702 of receiving, at the server security manager 306, a new password and an old password during a password update. The new and old passwords can be entered at the client security manager 314 or the server security manager 306 through a web interface. At step 704, the method 700 includes decrypting, by the server security manager 306, a plurality of device specific keys using the old password. The device specific keys can be previously encrypted using electronic code block (ECB), KDF, or PBKDF of the old password, and/or multiple random keys (or pseudorandom keys), wherein each random key of the multiple random keys is specific to an individual device associated with the user account for which the password is being updated. For example, if there are 3 computing devices associated with a user account, there can be 3 random keys such that each key is associated with an individual computing device. The number of computing devices and random keys can be any suitable number that a user or a manufacturer may desire. The method 700 can further include a step 706 of encrypting, by the server security manager 306, the plurality of device specific keys using the new password. The plurality of device specific keys can be encrypted, by the server security manager 306, based on a type of KDF of the new password and the multiple random keys (or pseudorandom keys) previously set forth in step 704. In this way, an added level of security is created by providing multiple different random keys that are each assigned to a specific device.

Figure 8A:
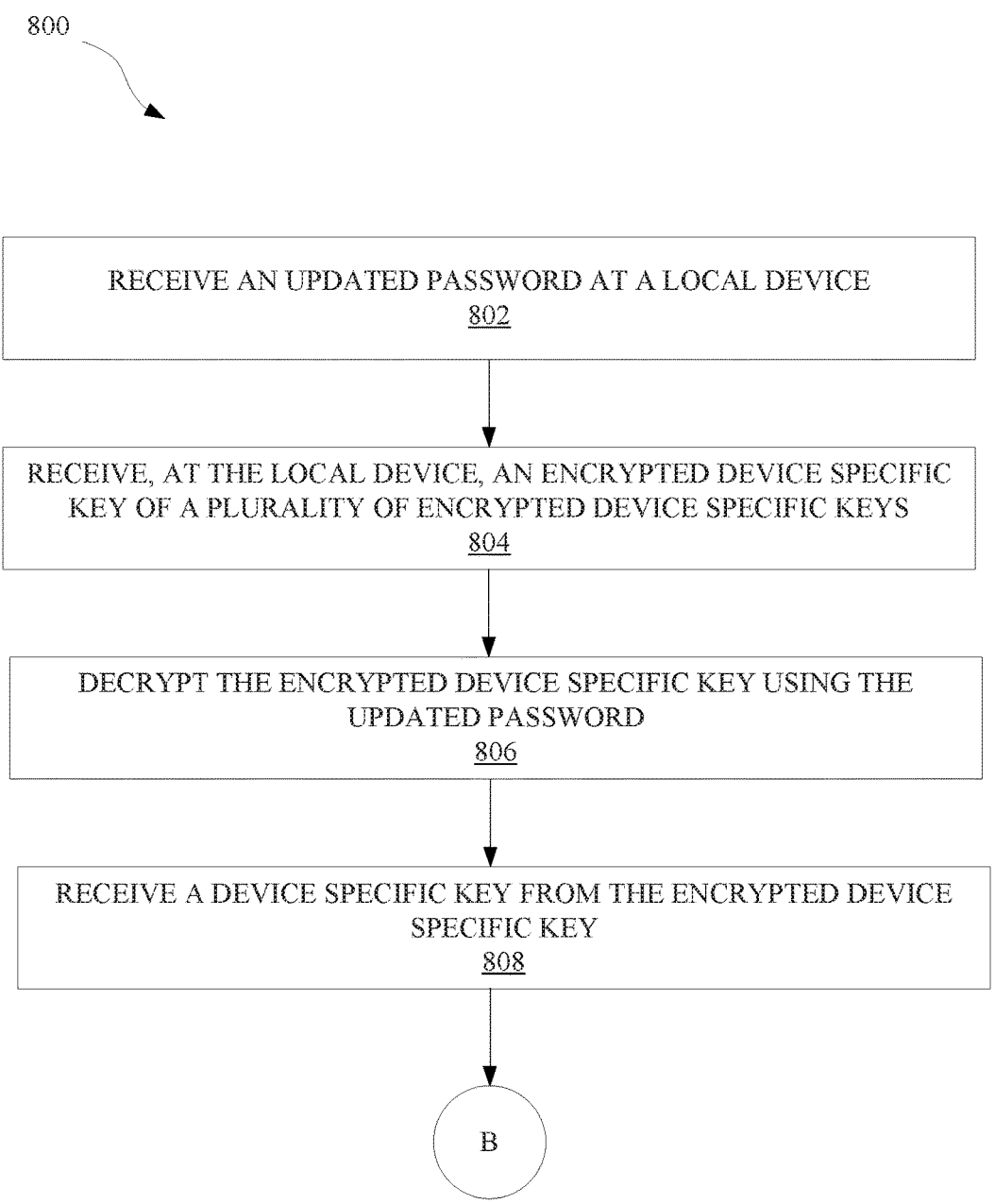
FIGS. 8A-8B illustrate a method for updating the password at a local device using a device specific key, according to some embodiments discussed herein.
Figure 8B:
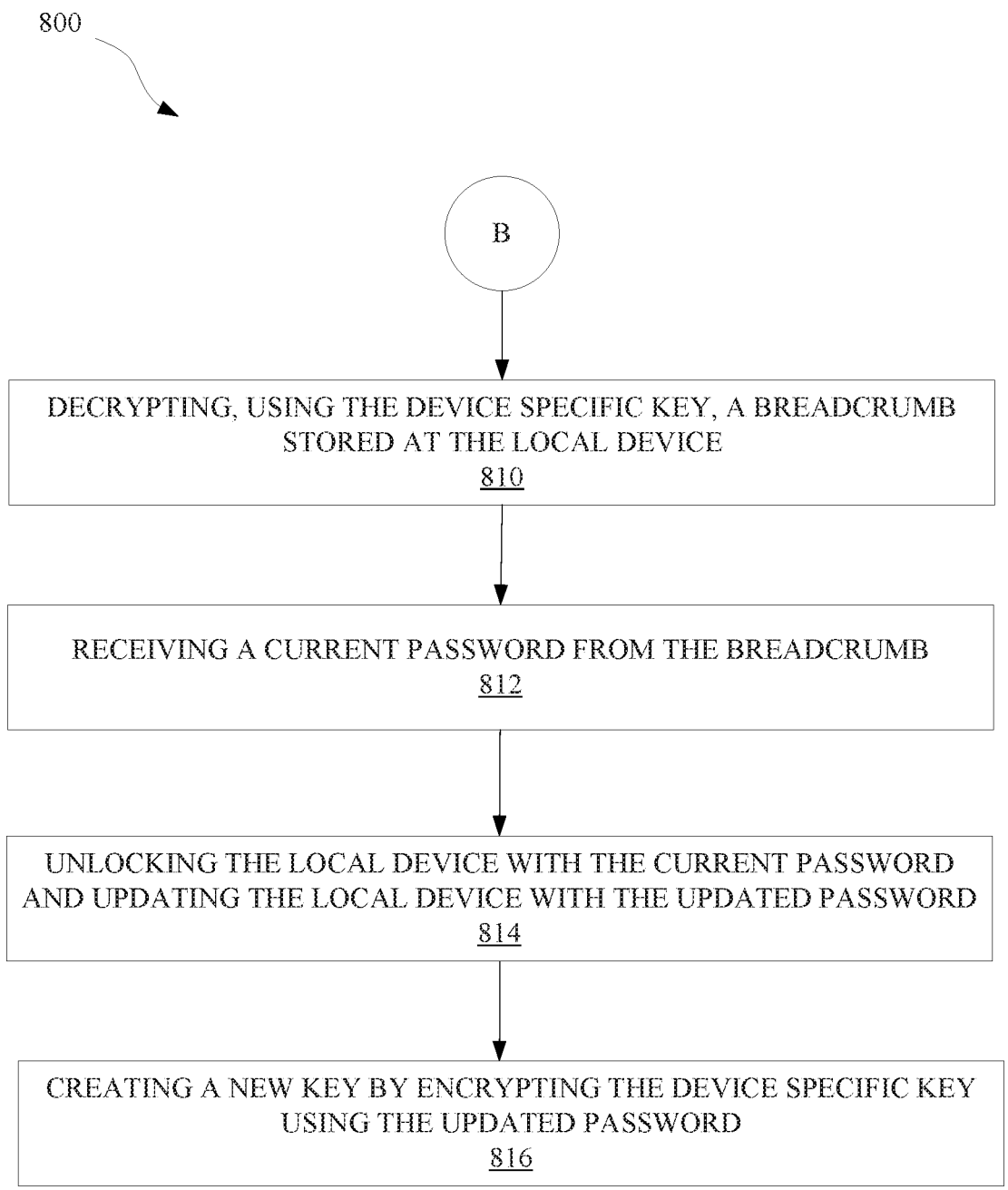

FIGS. 8A-8B illustrate a method 800 for updating the password at the client security manager 314 from a plurality of device specific keys. Specifically, FIG. 8A-8B illustrate how a plurality of random keys associated multiple devices can be used to update passwords for each of the multiple devices. The method 800 includes a step 802 of receiving, by the client security manager 314, an updated password. The updated password is a password that has already been used at a web service or other local device during a password updating procedure (e.g., method 700 of FIG. 7). At step 804, an encrypted device specific key of a plurality of encrypted device specific keys can be received or downloaded by the client security manager 314. The encrypted device specific key can be sent from a server or other computing device storing one or more encrypted device specific keys. The encrypted device specific key can be decrypted, by the client security manager 314, using the updated password, at step 806. Next, at step 808, a device specific key is received or otherwise derived from the encrypted device specific key by the client security manager 314. It should be noted that node B indicates a point where the method 800 transitions from FIG. 8A to FIG. 8B. At FIG. 8B, the method 800 includes a step 810 of using, by the client security manager 314, the device specific key to decrypt a breadcrumb that is stored at the client security manager 314. The breadcrumb can be stored at the client security manager 314 as a result of the previous password update, a default manufacturing process, or other device related feature. At step 812, as a result of decrypting the breadcrumb, a current password is received, by the client security manager 314, from the breadcrumb. Using the current password, at step 814, the local device can be unlocked and updated, by the client security manager 314, to use the updated password. The method 800 can further include a step 816 of creating, by the client security manager 314, a new breadcrumb or new device specific key, by encrypting a new random key using the new password. In some embodiments, a new breadcrumb or device specific key is generated, by the client security manager 314, by encrypting the updated password with the new random key. The new breadcrumb or device specific key can thereafter be sent to the server security manager 306 or stored at the client security manager 314.

When multiple breadcrumbs are stored, the client security manager 314 can rifle through multiple breadcrumbs in order to derive the appropriate current password for unlocking the client security manager 314. For example, if five breadcrumbs are stored at the client security manager 314 and only one breadcrumb includes the current password, all five breadcrumbs may need to be decrypted using the device specific key in order to find the breadcrumb containing the current password. Additionally, in some embodiments, each device can be associated with multiple device specific keys wherein each of the device specific keys relates to a version of the breadcrumb. For example, if three breadcrumbs are stored at the client security manager 314, there can be three different device specific keys that are each version specific for each of the breadcrumbs. In this way, in some embodiments, the client security manager 314 can receive more than one encrypted device specific key in order to unlock the particular breadcrumb that corresponds to the current password. The device specific keys can include any other suitable identifiers that correspond to the variety of breadcrumbs that can be stored at the client security manager 314. Additionally, the client security manager 314 can incorporate breadcrumb limits in order to prevent a threshold number of breadcrumbs from being stored on the client security manager 314 (e.g., no more than 10 breadcrumbs can be stored on the local device).

Figure 9:
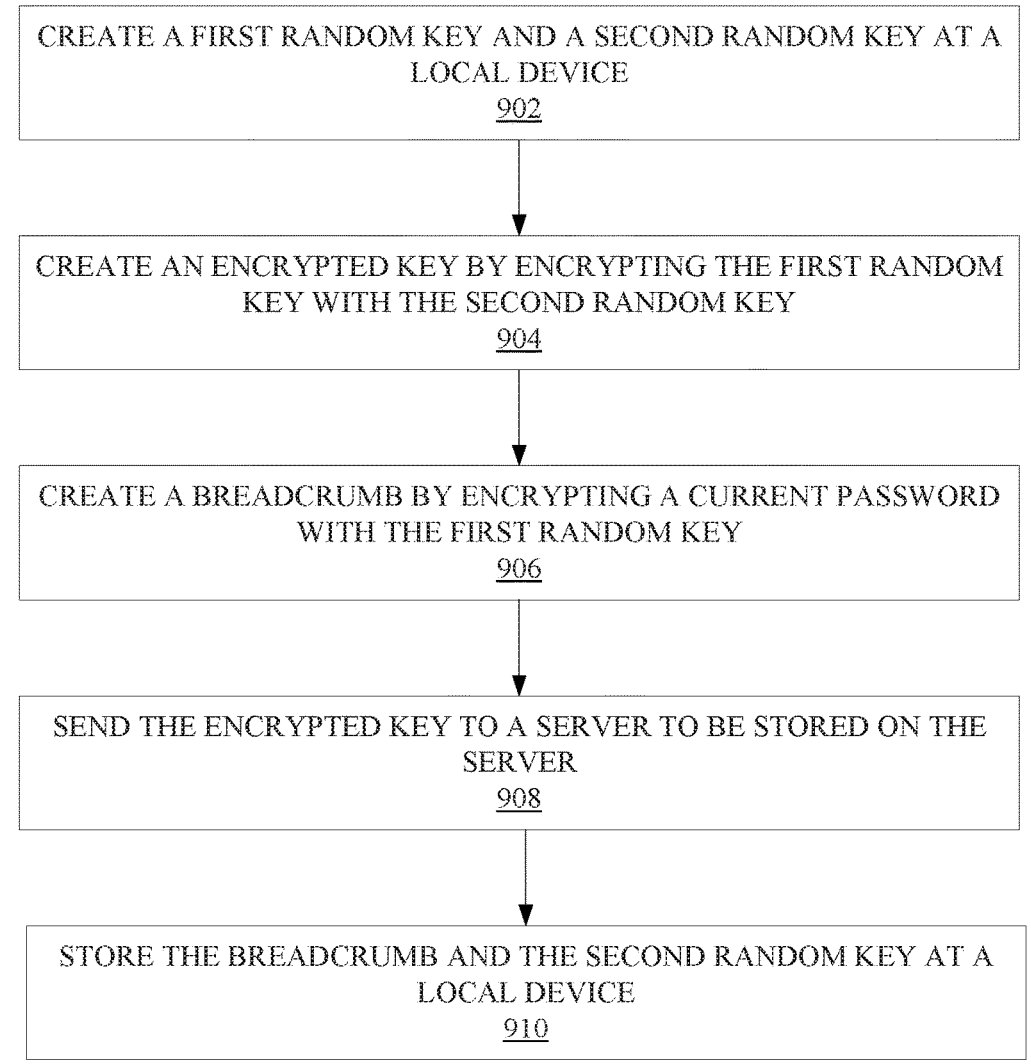
FIG. 9 illustrates a method for securing a computing device based on multiple random keys and a breadcrumb, according to some embodiments discussed herein.

FIG. 9 illustrates a method 900 for securing the client device 310 based on multiple random keys and a breadcrumb. The method 900 can include a step 902 of creating, by the client security manager 314, a first random key and a second random key. The first and second random keys can be generated according to any methods or embodiments discussed herein. At step 904, the method 900 includes creating, by the client security manager 314, an encrypted key by encrypting the first random key with the second random key. The algorithm for encrypting the encrypted key can use any suitable steps for encrypting data. Additionally, method 900 can include a step 906 of creating, by the client security manager 314, a breadcrumb by encrypting a current password using the first random key. The breadcrumb can be created and modified according to any methods or embodiments discussed herein with regards to breadcrumbs. At step 908, the encrypted key is sent, by the client security manager 314, to a server security manager 306 to be stored. The server security manager 306 can be associated with a user account that can be accessed by the client security manager 314. The method 900 can further include a step 910 of storing, by the client security manager 314, the breadcrumb and the second random key at the client security manager 314.

Figure 10:
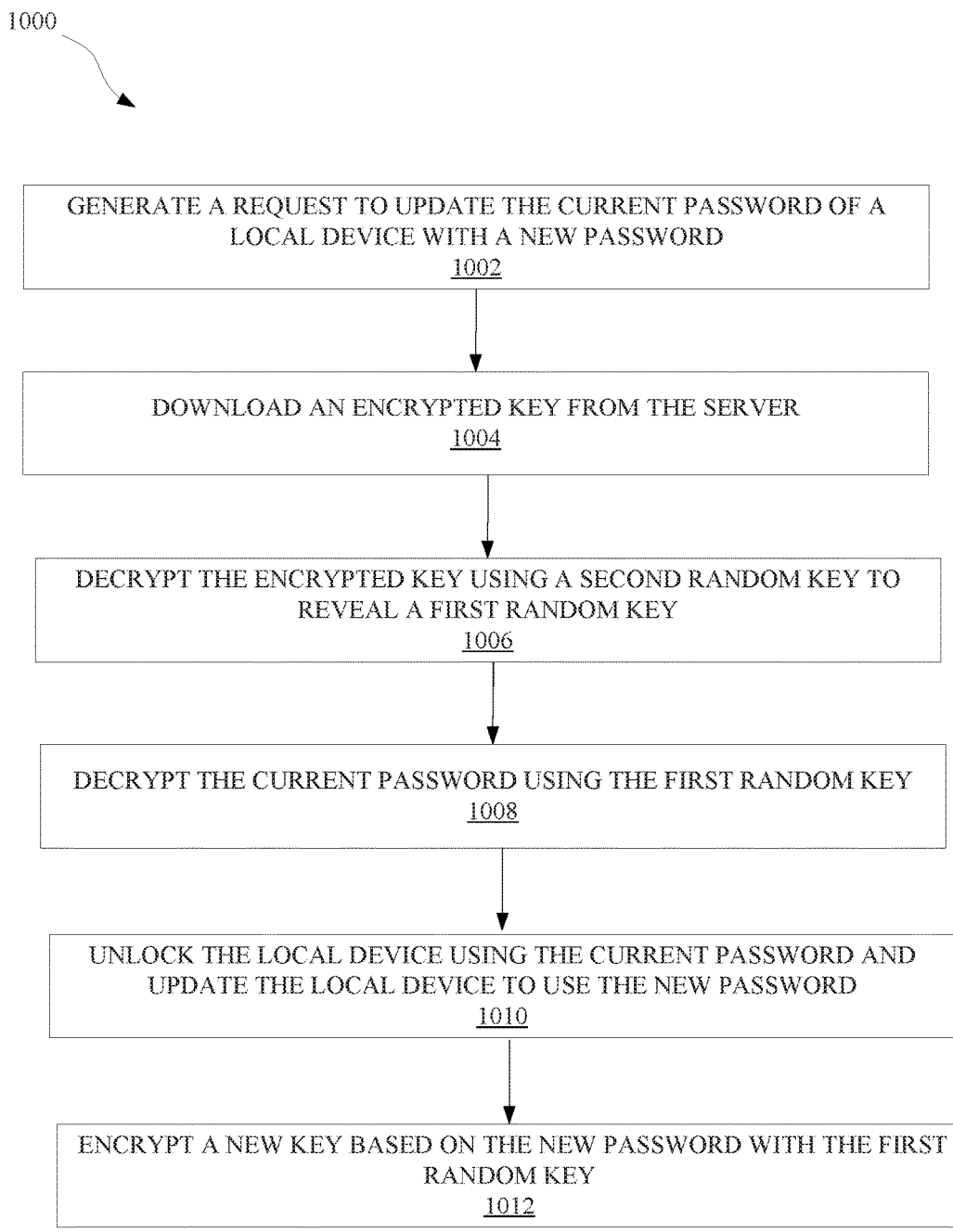
FIG. 10 illustrates a method for updating a password of a local device based on multiple random keys and a breadcrumb, according to some embodiments discussed herein.

FIG. 10 illustrates a method 1000 for updating, by the client security manager 314, a password of the client device 310 based on multiple random keys and a breadcrumb. Specifically, the method 1000 can be used to update the password of the client device 310 that has been locked according to method 900. The method 1000 can include a step 1002 of receiving, by the client security manager 314, a request to update the current password with a new password. Next, at step 1004, the client security manager 314 can download an encrypted key from the server security manager 306. The method 1000 can further include a step 1006 of decrypting, by the client security manager 314, the encrypted key using the second random key in order to reveal the first random key. At step 1008, the current password is decrypted, by the client security manager 314, using the first random key. Using the current password, at step 1010, the client security manager 314 unlocks the computing device 310 using the current password, and the client security manager 314 updates the client device 310 to use the new password. The method 1000 can further include a step 1012 wherein the client security manager 314 encrypts the new password with a new first random key and stores the resulting encrypted new password at the client security manager 314. Additionally, the new first random key can be encrypted with the new password and sent to the server security manager 306.

Figure 11:
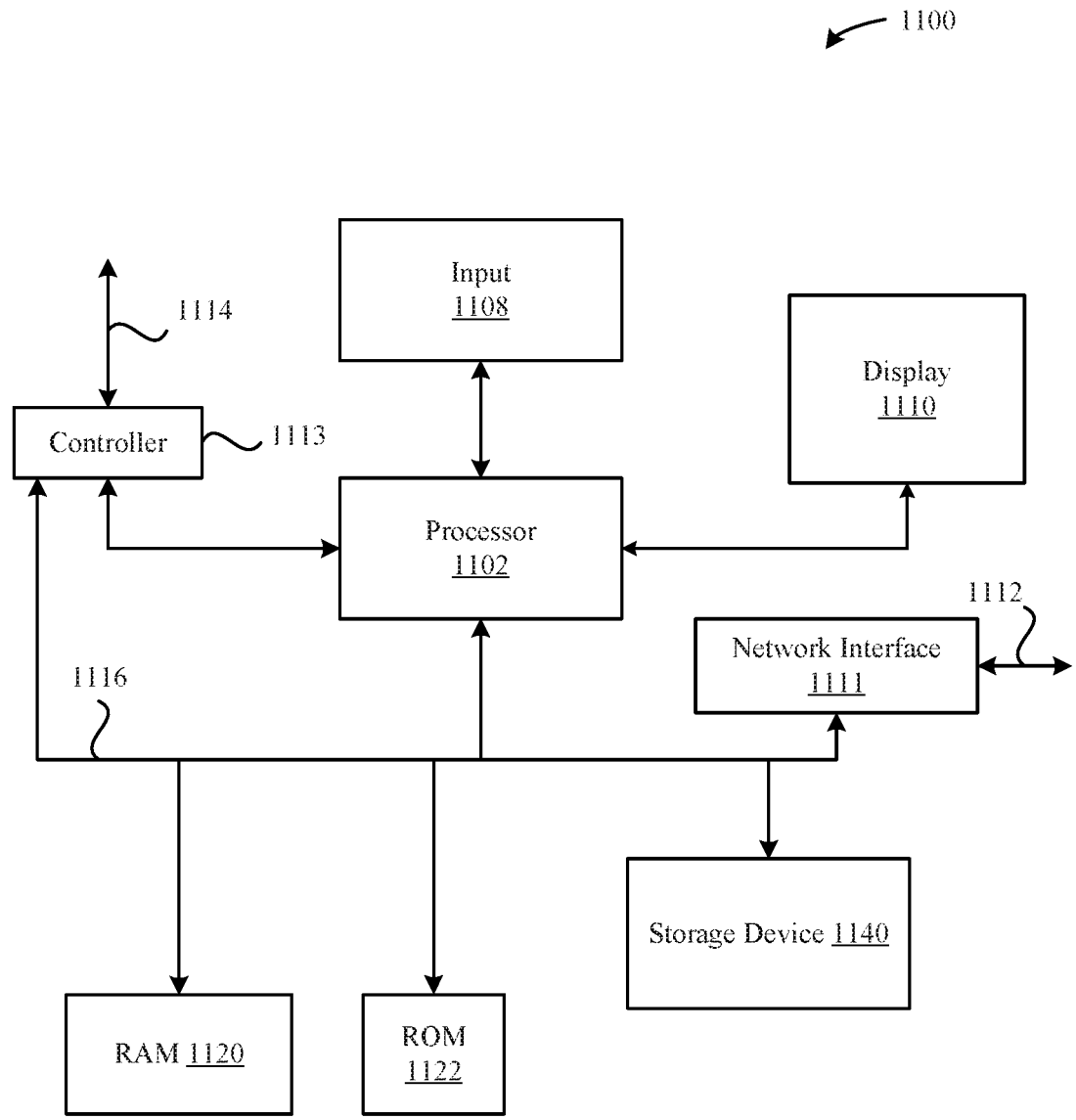
FIG. 11 illustrates a detailed view of a computing device that can be used to implement the various components described herein.

FIG. 11 illustrates a detailed view of a computing device 1100 that can be used to implement the various components described herein, according to some embodiments. In particular, the detailed view illustrates various components that can be included in the laptop computing device 106 and mobile device 108 as illustrated in FIG. 3. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to display information to the user. A data bus 1116 can facilitate data transfer between at least a storage device 1140, the processor 1102, and a controller 1113. The controller 1113 can be used to interface with and control different equipment through and equipment control bus 1114. The computing device 1100 can also include a network/bus interface 1111 that couples to a data link 1112. In the case of a wireless connection, the network/bus interface 1111 can include a wireless transceiver. For example, for laptop computing device 106 and mobile device 108, the network/bus interface 1111 can include radio transceiver to connect with a plurality of communication networks associated with a plurality of mobile network operators.

The computing device 1100 also include a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the laptop computing device 106 and mobile device 108.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for updating passwords at client devices associated with a user account, the method comprising, at a server device that stores a first encrypted key including a current password:
   receiving a first indication to update the current password at a first client device with a new password, wherein the first client device is associated with the user account;
   providing the first encrypted key to the first client device, wherein the first client device decrypts the first encrypted key by using the current password;
   receiving, from the first client device, a second encrypted key that includes the new password;
   storing the second encrypted key; and
   in response to receiving a second indication from a second client device to update the current password at the second client device with the new password, wherein the second client device is associated with the user account:
      providing the second encrypted key to the second client device, wherein the second client device decrypts the second encrypted key with the new password that was received at the second client device.

2. The method of claim 1, wherein the first encrypted key was generated at the first client device in response to setting up the first client device with the current password.

3. The method of claim 1, wherein the current password of the first encrypted key is encrypted with a primary random key.

4. The method of claim 1, wherein the second encrypted key is derived from a client encrypted key that is stored at the first client device, and the client encrypted key includes the new password encrypted with a primary random key.

5. The method of claim 1, wherein the first encrypted key was generated by another client device that is associated with the user account.

6. The method of claim 1, wherein the server device receives the first indication in response to the current password and the new password being received at the first client device.

7. The method of claim 1, wherein the first encrypted key is a random key, a pseudo-random key, or a password-based key.

8. At least one non-transitory computer-readable storage medium configured to store instructions that, in response to being executed by at least one processor included in a computing device, cause the computing device to:
   receive a first indication to update a current password at a first client device with a new password, wherein the first client device is associated with a user account;
   provide a first encrypted key that is stored at the computing device to the first client device, wherein the first client device decrypts the first encrypted key by using the current password;
   receive, from the first client device, a second encrypted key that includes the new password;
   store the second encrypted key; and
   in response to receiving a second indication from a second client device to update the current password at the second client device with the new password, wherein the second client device is associated with the user account:
      provide the second encrypted key to the second client device, wherein the second client device decrypts the second encrypted key with the new password that was received at the second client device.

9. The at least one non-transitory computer-readable storage medium of claim 8, wherein the first encrypted key was generated at the first client device in response to setting up the first client device with the current password.

10. The at least one non-transitory computer-readable storage medium of claim 8, wherein the current password of the first encrypted key is encrypted with a primary random key.

11. The at least one non-transitory computer-readable storage medium of claim 8, wherein the first encrypted key was generated by another client device that is associated with the user account.

12. The at least one non-transitory computer-readable storage medium of claim 8, wherein the first encrypted key is a random key, a pseudo-random key, or a password-based key.

13. The at least one non-transitory computer-readable storage medium of claim 8, wherein the second encrypted key is derived from a client encrypted key that is stored at the first client device, and the client encrypted key includes the new password encrypted with a primary random key.

14. The at least one non-transitory computer-readable storage medium of claim 8, wherein the computing device receives the first indication in response to the current password and the new password being received at the first client device.

15. A system for updating passwords at client devices associated with a user account, the system comprising:
   at least one hardware processor; and
   at least one memory storing instructions that, when executed by the at least one hardware processor, cause the system to:
      receive a first indication to update a current password at a first client device with a new password, wherein the first client device is associated with the user account;
      provide a first encrypted key that is stored at the system to the first client device, wherein the first client device decrypts the first encrypted key by using the current password;
      receive, from the first client device, a second encrypted key that includes the new password;
      store the second encrypted key; and
      in response to receiving a second indication from a second client device to update the current password at the second client device with the new password, wherein the second client device is associated with the user account:
         provide the second encrypted key to the second client device, wherein the second client device decrypts the second encrypted key with the new password that was received at the second client device.

16. The system of claim 15, wherein the current password of the first encrypted key is encrypted with a primary random key.

17. The system of claim 15, wherein the first encrypted key was generated by another client device that is associated with the user account.

18. The system of claim 15, wherein the first encrypted key is a random key, a pseudo-random key, or a password-based key.

19. The system of claim 15, wherein the second encrypted key is derived from a client encrypted key that is stored at the first client device, and the client encrypted key includes the new password encrypted with a primary random key.

20. The system of claim 15, wherein the system receives the first indication in response to the current password and the new password being received at the first client device.

\* \* \* \* \*